US012812345B2

(12) United States Patent
Trusinski et al.

(10) Patent No.: US 12,812,345 B2
(45) Date of Patent: Nov. 24, 2026

(54) ADAPTIVE SYNCHRONIZATION OF DISPLAY AND SHORT-RANGE WIRELESS TRANSMISSION

(71) Applicant: Zebra Technologies Corporation, Lincolnshire, IL (US)

(72) Inventors: Marek Trusinski, Kings Park, NY (US); Yi Wei, St. James, NY (US); Fu Yuan Hsueh, Taoyuan (TW); Rohan Chopra, Syosset, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/970,491

(22) Filed: Dec. 5, 2024

(65) Prior Publication Data

US 2026/0164220 A1 Jun. 11, 2026

(51) Int. Cl.
*G09G 5/12* (2006.01)
*H04W 4/80* (2018.01)

(52) U.S. Cl.
CPC ................ *H04W 4/80* (2018.02); *G09G 5/12* (2013.01); *G09G 2340/0435* (2013.01); *G09G 2354/00* (2013.01)

(58) Field of Classification Search
CPC ................................ G07F 7/0886; G09G 5/12
See application file for complete search history.

(56) References Cited

U.S. PATENT DOCUMENTS

2007/0281617 A1* 12/2007 Meylan ............. H04W 74/0808 455/501
2018/0059868 A1* 3/2018 Brahma ............... G09G 3/2022
2019/0311680 A1* 10/2019 Koo .......................... G06F 3/14
2024/0203333 A1* 6/2024 Kim ..................... G09G 3/3208
2024/0377909 A1* 11/2024 Jung ................... G06F 3/04184

* cited by examiner

*Primary Examiner* — Kevin M Nguyen

(57) ABSTRACT

A method comprises: determining, at a controller of a computing device, an idle time period corresponding to a display of the computing device; enabling a transmission function of a short-range wireless communication assembly of the computing device during the idle time period; and disabling the transmission function of the short-range wireless communication assembly outside the idle time period.

19 Claims, 5 Drawing Sheets

ADAPTIVE SYNCHRONIZATION OF DISPLAY AND SHORT-RANGE WIRELESS TRANSMISSION

BACKGROUND

In some computing devices, a near-field communication (NFC) antenna may be placed in physical proximity to a component sensitive to electromagnetic fields, such as a display panel. Operation of the NFC antenna in such devices can affect the performance of the display, e.g., leading to visual artifacts.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
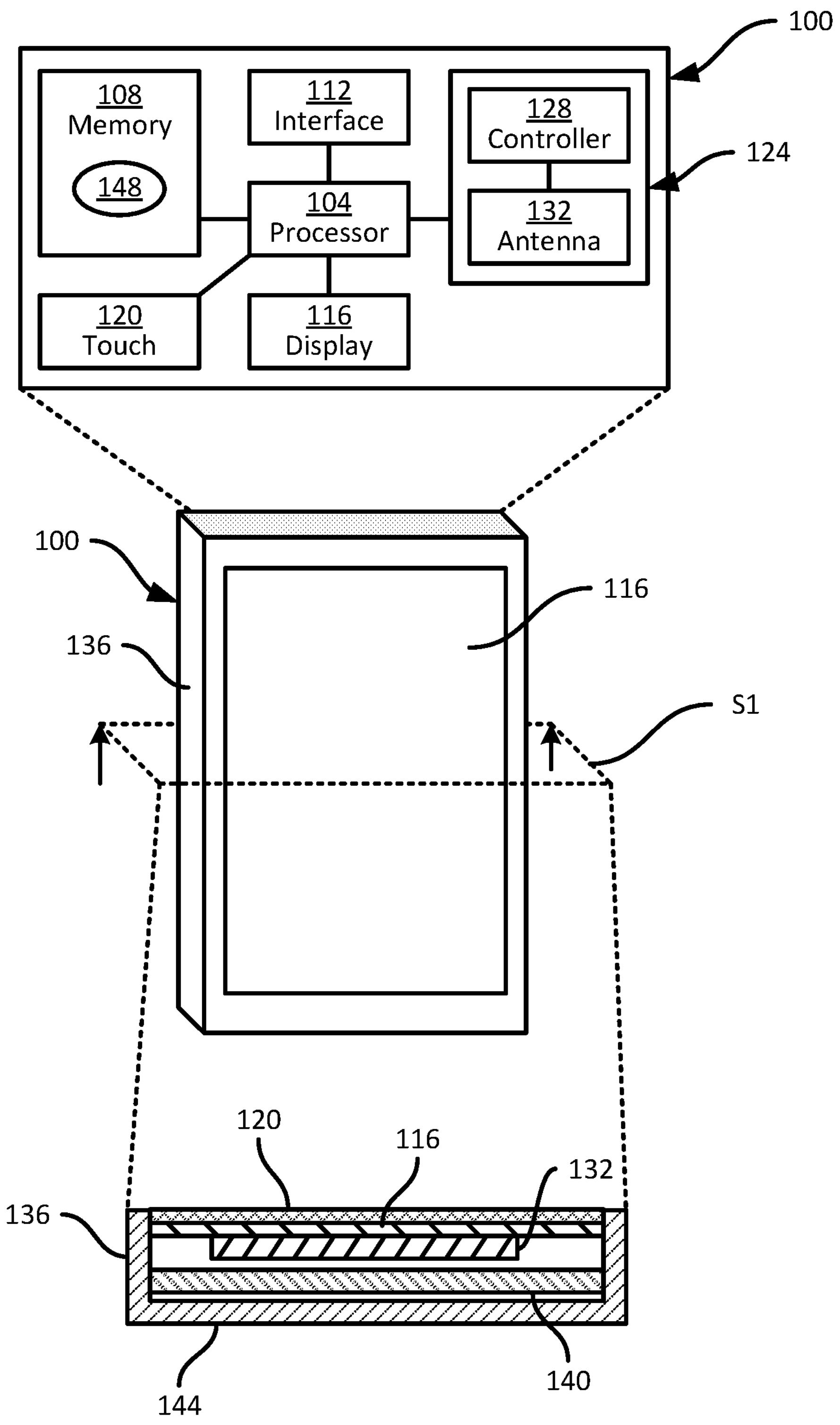
FIG. 1 is a diagram of a computing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method, comprising: determining, at a controller of a computing device, an idle time period corresponding to a display of the computing device; enabling a transmission function of a short-range wireless communication assembly of the computing device during the idle time period; and disabling the transmission function of the short-range wireless communication assembly outside the idle time period.

Additional examples disclosed herein are directed to a computing device, comprising: a display; a short-range wireless communication assembly including an antenna; and a processor configured to: determine an idle time period corresponding to the display; enable a transmission function of the short-range wireless communication assembly during the idle time period; and disable the transmission function of the short-range wireless communication assembly outside the idle time period.

FIG. 1 illustrates a computing device 100, such as a mobile computer, smart phone, or the like. The device 100 can be implemented in a wide variety of other form factors, including a tablet computer, a laptop computer, a barcode scanner, an RFID reader, and the like.

Certain internal components of the device 100 are illustrated in FIG. 1. The device 100 includes a processor 104, such as a central processing unit (CPU), graphics processing unit (GPU) or the like, connected with a non-transitory computer readable medium such as a memory 108. The processor 104 and the memory 108 are implemented as one or more integrated circuits (ICs). The device 100 also includes a communications interface 112 enabling communication between the device 100 and other computing devices, via suitable wired and/or wireless links, including any suitable combination of local-area networks, wide-area networks, and peer-to-peer links.

The device 100 further includes a display 116, such as a liquid crystal display (LCD), an organic light-emitting diode (OLED)-based display, or other suitable display panel. The display 116 is controllable by the processor 104 to present graphics, text, and the like, e.g., for viewing by an operator of the device 100. The device 100 can also include other output devices (e.g., devices configured to generate output perceptible by the operator of the device 100) in some examples, such as a speaker, a motor for haptic output, and the like. The device 100 further includes an input device such as a touch panel 120 configured to receive input, e.g., from the operator of the device 100. The touch panel 120 can be implemented as a capacitive touch panel integrated with the display 100, in some examples. The device 100 can also include other input devices (e.g., devices configured to receive input from the operator and convert such input to data for handling by the processor 104), including for example a keypad, a microphone, or the like (or any suitable combination of such input devices).

The device 100 also includes a short-range wireless communication assembly 124, such as a near-field communication (NFC) assembly, or the like. The short-range wireless communication assembly 124 is configured to facilitate short-range (e.g., over distances of less than about 10 cm) exchange of information between the device 100 and other computing devices such as payment terminals, other mobile computers, or the like. The assembly 124 can permit the device 100 to emulate payment cards such as credit cards and the like, and/or to read data from articles such as smart payment cards. The assembly 124 includes a controller 128, and an antenna 132. The controller 128 can be configured to transmit and receive data, via the antenna 132, at a frequency of about 13.5 MHz. Data received via the antenna 132 can be provided to the processor 104 by the controller 128, and data can be received at the controller 128 from the processor 104, for transmission via the antenna 132. The controller 128 can be implemented as a field-programmable gate array (FPGA), and application-specific integrated circuit (ASIC), or the like. In some examples, the controller 128 can be implemented by the processor 104 (e.g., as a dedicated hardware portion of the processor 104, or in software via a driver application or the like executed by the processor 104).

The components of the device 100 can be supported by a housing 136. For example, as shown in the cross section S1 (simplified for illustrative purposes), the housing 136 can support the display 116 and the touch panel 120, and an interior of the device enclosed by the housing 136 and the display 116 can contain the other components of the device 100. For example, the device 100 can include a main board 140 such as a printed circuit board (PCB), or a plurality of PCBs, carrying the processor 104, memory 108, and communications interface 112. The board 140 can also carry the controller 128 in some examples.

The antenna 132, in this example, is disposed "behind" the display 116, e.g., between the display 116 and the main board 140. The antenna 132 can have a primary radiation lobe extending through the display 116, rather than away from the display 116 through the back 144 of the housing 136. As will be understood by those skilled in the art, the display 116 and the touch panel 120 can each include a plurality of layers of conductive material. The display 116 and the touch panel 120 can therefore attenuate radiation emitted by the antenna 132. Attenuation of radiation from the antenna 132 can negatively impact performance of the assembly 124, e.g., by reducing the effective range of the assembly 124. One approach to mitigating such performance impacts is to increase the transmission power applied at the antenna 132 (e.g., by the controller 128). However, due to the relatively low operating frequency of the antenna 132 (e.g., compared to the near-GHz or multi-GHz operating frequencies of cellular or wireless local area network antennas employed by the interface 112), transmissions from the antenna 132 may interfere with the display 116, e.g., causing flickering, ghosting, or other visual artifacts. The transmissions may also interfere with the touch panel 120, e.g., causing phantom touch detections or the like. Increasing transmission power at the antenna 132 may increase the severity of such artifacts.

In other words, improving the performance of the antenna 132 may negatively affect performance of the display 116 and/or the touch panel 120, and avoiding such negative effects (e.g., by reducing transmission power at the antenna 132) may instead impact the performance of the antenna 132. The device 100 is therefore configured, as discussed below, to implement synchronization functionality that selectively enables and disables a transmission function of the antenna 132, based on idle periods in the duty cycles of either or both of the display 116 and the touch panel 120. The synchronization function configures the antenna 132 to transmit signals during such idle periods, when the display 116 and/or touch panel 120 are less susceptible to perceptible interference artifacts. Outside of such idle periods, transmission functionality of the antenna 132 may be disabled.

The memory 108 stores a plurality of applications executable by the processor 104, including a short-range communications control application 148 (also referred to simply as the application 148), whose execution by the processor 104 configures the processor 104 to perform various actions to effect the above synchronization function. In some examples, the functionality described below as being implemented by the application 148 can be implemented by the controller 128, instead of by the processor 104. For example, the application 148 can be implemented in firmware of the controller 128. In other examples, the functionality of the application 148 can be implemented in a distinct hardware element, separate from the processor 104 and the controller 128, such as another ASIC, FPGA, or the like. In some examples, a distinct control element (e.g., an FPGA or the like) can be implemented in addition to the processor 104 and the controller 128, or as a replacement to the controller 128, that controls both the antenna 132 and the display 116. That control element can perform display-related control operations, e.g., based on data received from the processor 104 for rendering at the display 116, as well as short-range wireless communication control operations, e.g., enabling and disabling transmission functionality at the antenna 132.

Figure 2:
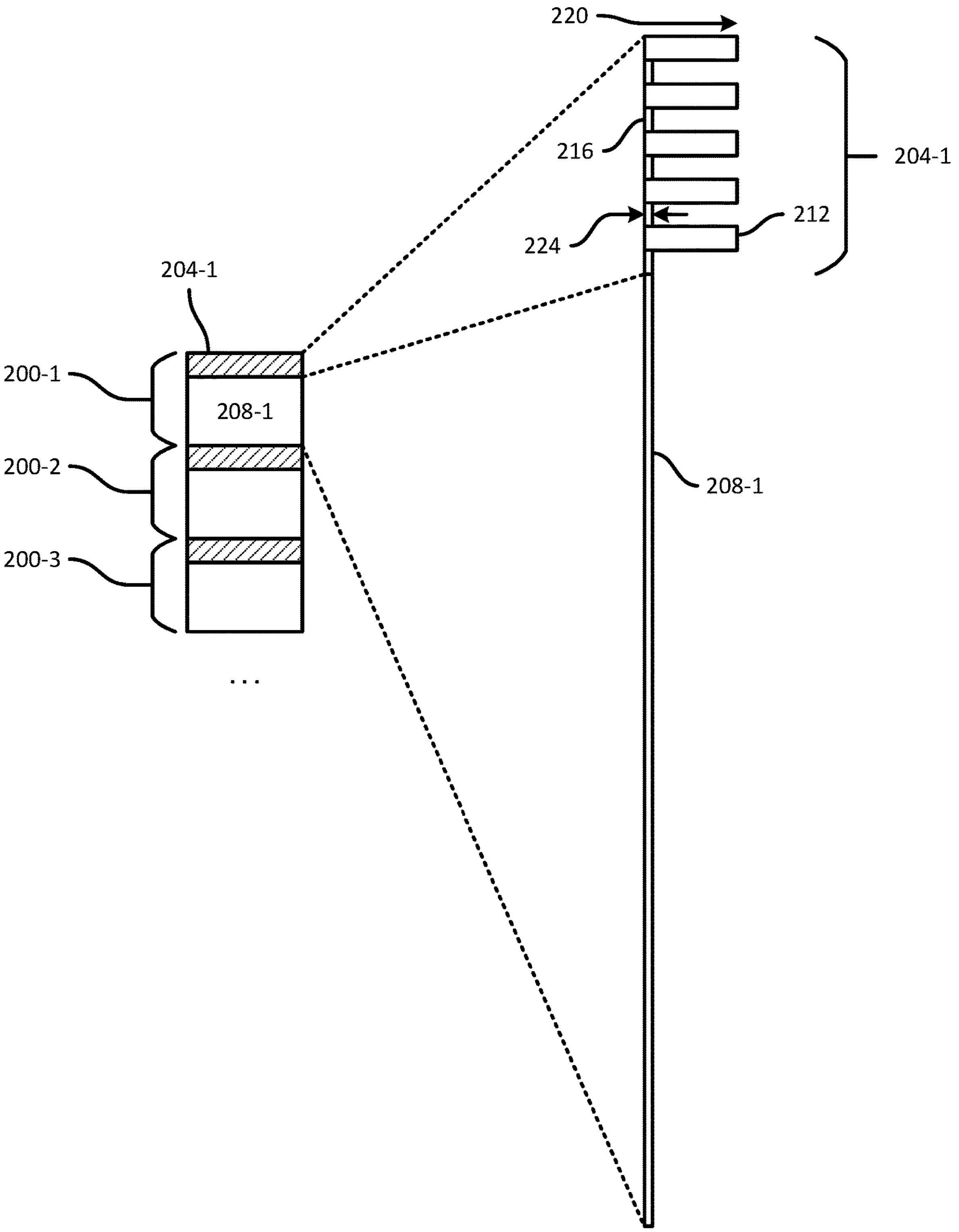
FIG. 2 is a diagram of a near-field communication (NFC) control cycle.

Before discussing the functionality implemented by the device 100, an example short-range wireless communication control mechanism, e.g., for NFC communications, is shown in FIG. 2. The assembly 124 can be configured, upon activation, to repeat a polling cycle, e.g., according to specifications established by the NFC Forum. The assembly 124 can be configured to transmit polling signals, and monitor for responses to those polling signals, and/or to monitor for polling signals from other devices, over the course of a time period, of which three examples 200-1, 200-2, and 200-3 are shown in FIG. 2. The time periods 200-1, 200-2, and 200-3 are also referred to collectively as the time periods 200, and generically as a time period 200. Similar nomenclature may also be used elsewhere herein for reference numerals with hyphenated suffixes.

During each time period 200, the assembly 124 can repeat a set of actions. In this example, the time period 200-1 is illustrated in detail on the right-hand side of FIG. 2. The time period 200-1 includes a polling portion 204-1, during which the assembly 124 is configured to transmit one or more polling signals via the antenna 132, and to monitor for responses to such polling signals, e.g., from payment cards or the like. The time period 200-1 also includes an emulation sub-period 208-1.

The polling portion 204-1 can be subdivided into at least one polling sub-period 212, and at least one corresponding listening sub-period 216. In this example, each polling portion 204 includes five polling sub-periods 212, and five listening sub-periods 216. Each pair of a polling sub-period 212 and a listening sub-period 216 can be configured to detect and/or receive data from nearby devices or articles implementing different NFC standards (e.g., NFC Type A, Type B, Type F or FeliCa at 424 kbit/s, Type F or FeliCa at 212 kbit/s, and the like). The detailed view on the right-hand side of FIG. 2 illustrates whether a transmission function of the assembly 124 is active. For example, during the polling sub-periods 212, the controller 128 can apply a first power level 220, e.g., a default or maximum design power, to the antenna 132 to transmit at least one polling signal. During the listening sub-periods 216, the controller 128 can apply an idle power level 224 to the antenna 132 during the listening sub-periods. The idle power level can be zero, in some examples, but need not be exactly zero. The lengths of the polling sub-periods 212 and the listening sub-periods 216 need not be substantially equal as shown in FIG. 2. For example, the device 100 can be configured to transmit a polling signal during a polling sub-period 212 with a length of about 1 millisecond, and the listening sub-period 216 can have a length of 24 ms. A wide variety of other sub-period lengths can also be used.

During the emulation sub-period 208-1 of the time period 200-1, the assembly 124 can be configured to listen for external polling signals, e.g., from another device performing a polling portion 204-1. In other words, during the polling sub-periods 212 and listening sub-periods 216, the device 100 seeks nearby NFC devices such as payment cards or the like. During the emulation sub-period 208-1, the device 100 emulates a payment card or the like, and awaits a polling signal from a nearby reader device, if any is present. The idle power level 224 is therefore also used during the emulation sub-period 208-1. As will be apparent, if the assembly 124 detects a polling signal (via the antenna 132) during the emulation sub-period 208-1, the controller 128 may apply the first power level 220 to the antenna 132 to transmit one or more responses to such a polling signal.

The length of time occupied by the polling portion 204-1 and the emulation sub-period 208-1 can be defined by any suitable standard. In this example, the total length of the time period 200-1 can be about 525 ms, with the polling portion occupying about 125 ms and the emulation sub-period 208-1 occupying about 400 ms. Each pair of a polling sub-period 212 and a listening sub-period can occupy about 25 ms, as noted above. A wide variety of other configurations can also be applied, however.

When the time period 200-1 is complete, the assembly 124 can be configured to repeat the configuration shown above during the time periods 200-2, 200-3, and so, until the assembly 124 is deactivated (e.g., put in a sleep state, disabled, or the like). The power level applied to the antenna 132 at each polling sub-period 212, in this configuration, is substantially equal, and may be equivalent to a default or maximum design power for the assembly 124.

Figure 3:
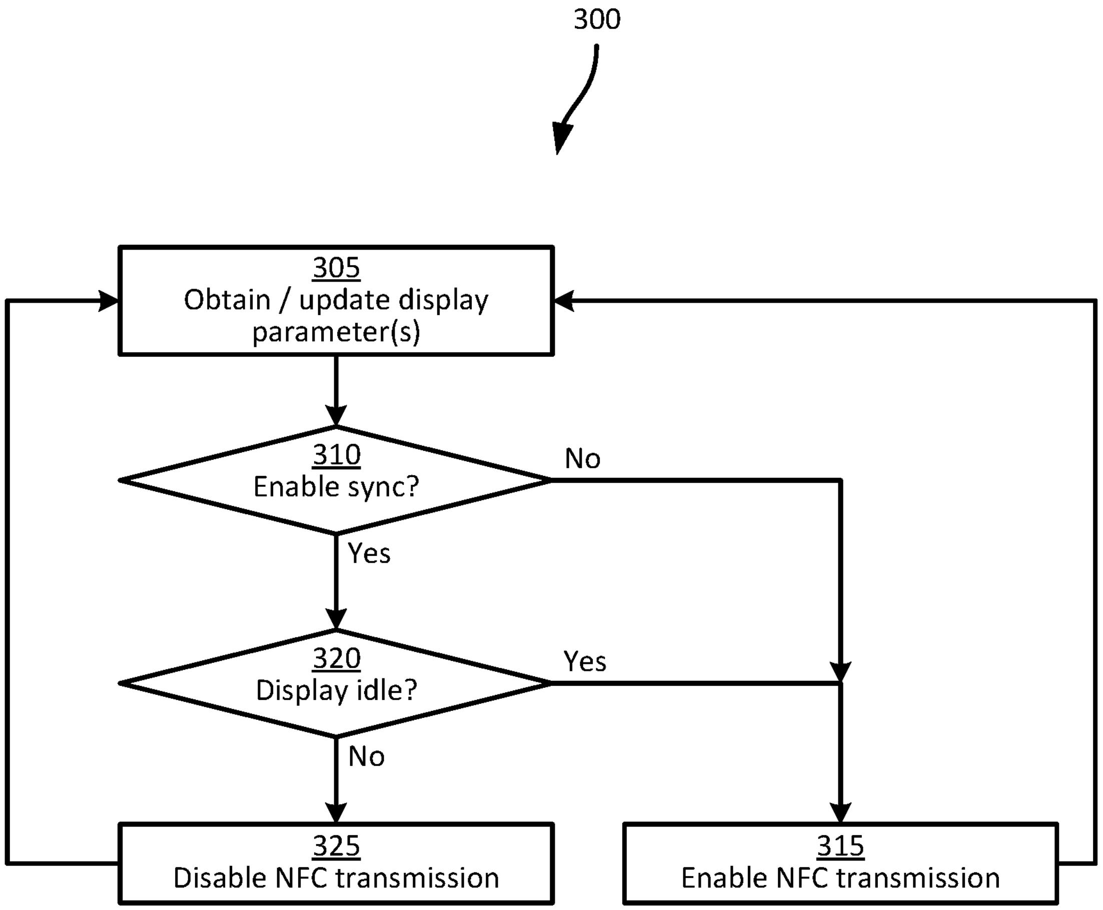
FIG. 3 is a flowchart of a method for adaptive synchronization of a display and short-range wireless transmissions of the device of FIG. 1.

Turning to FIG. 3, a method 300 of adaptive synchronization between a display and short-range wireless transmissions is shown. The method 300 will be described in conjunction with its performance in the device 100, and in particular by the processor 104, via execution of the application 148. As will be apparent, however, in some examples the controller 128 can perform some or all of the blocks of the method 300. In further examples, an integrated display/NFC controller as mentioned earlier can perform the method 300.

At block 305, the device 100 (e.g., the processor 104, the controller 128, or an integrated display/NFC controller as noted above) is configured to obtain one or more operating parameters corresponding to the display 116. As will be discussed further below, at block 305 the device 100 can also obtain operating parameters corresponding to the touch panel 120 in some examples. The operating parameter(s) obtained at block 305 are subsequently used to determine an idle time period corresponding to the display 116 (and/or the touch panel 120). An idle time period is a period of time during which the display 116 is less susceptible, or not susceptible, to perceptible interference due to transmission of signals by the antenna 132. That is, during an idle time period, operation of the antenna 132 to transmit signals may produce fewer or no visual artifacts such as flickering and the like.

Various operating parameters can be obtained at block 305. In some examples, block 305 can be performed at startup, e.g., when the device 100 is powered or on woken from sleep, and the display 116 and assembly 124 are initialized. In other examples, block 305 can be performed periodically, e.g., substantially in real-time to monitor the current state of the display 116 (e.g., with a periodicity of less than one millisecond).

The operating parameters obtained at block 305 can include, for example, timing data obtained from a display driver process executed by the processor 104. The timing data can include, for example, a refresh rate (e.g., in frames per second) of the display 116. The timing data can also include one or more values that define the idle time, e.g., blanking periods such as a vertical front porch (VFP) value, and vertical back porch (VBP) value, a vertical sync (VSync) value, or the like. The VFP value indicates a period of time before frame rendering begins (that is, before the display 116 begins generating output visible to an operator of the device 100). The VBP value indicates a period of time after frame rendering ends, and the VSync value indicates a further period of time following the VBP, and before the VFP of the next frame.

The above values can be obtained in a message generated by the display driver, for example. In other examples, the above values can be determined by monitoring a control signal of the display 116, such as a tearing effect (TE) control signal. In other examples, the operating parameter can be obtained by monitoring a power level applied to one or more pixels or sets of pixels within the display 116.

Figure 4A:
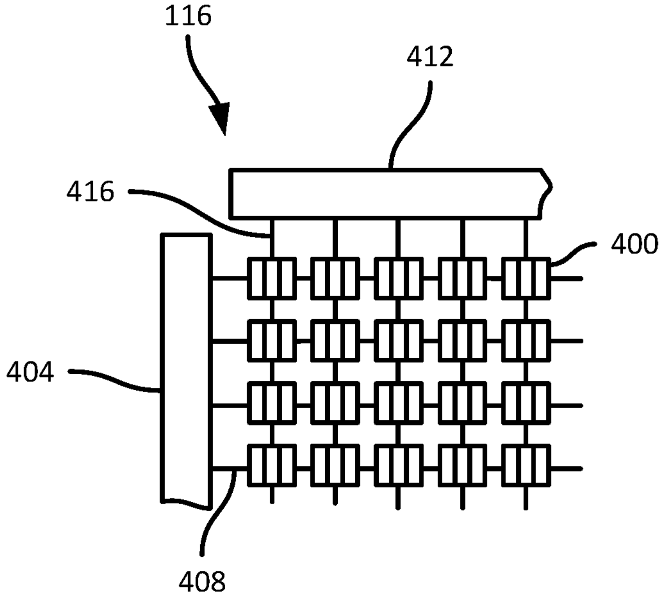
FIG. 4A is a diagram of a portion of the display of the device of FIG. 1.

Turning to FIG. 4A, a simplified diagram of a portion of the display 116 is shown. The display 116 includes a plurality of pixels 400 (e.g., several hundred thousand to several million, depending on the resolution of the display 116), each with controllable red, green and blue components. The display 116 can also include an active matrix defining power and data lines to each pixel 400. The display 116 can include a gate driver 404 configured to supply power, for example to rows of pixels or to individual pixels on each row via respective gate lines 408. The display 116 can also include a data driver 412 configured to send signals to each pixel 400 including color values, e.g., via data lines 416.

As will be apparent to those skilled in the art, during idle time periods such as the blanking periods (also referred to as blanking intervals) noted above, the gate driver 404 may disable power delivery to the pixels 400, such that although the display 116 is actively in communication with the processor 104 or other control hardware, the pixels 400 themselves are inactive. While the antenna 132 may be electromagnetically coupled with the components of the active matrix of the display 116, including the gate lines 408 and data lines 416, while the gate lines are idle and the pixels 400 are dark, radiation emitted by the antenna 132 will produce little or no visible distortion in the display 116.

Obtaining the parameter(s) at block 305 can include monitoring a signal level on one or more of the gate lines 408, and/or an activity indicator at the gate driver 404, to determine whether the gate lines 408 are currently powering the pixels 400. For example, a low signal (e.g., OV, or any signal below a predetermined threshold) on the gate lines 408 indicates that the display 116 is currently in an idle period.

Figure 4B:
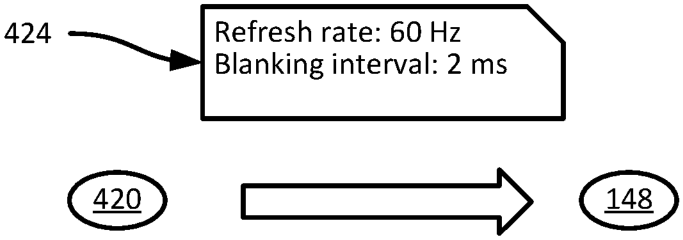
FIG. 4B is a diagram illustrating an example performance of block 305 of the method of FIG. 3.

FIG. 4B illustrates another example performance of block 305, in which a display driver application 420 provides timing data 424 to the application 148. The driver 420 can provide, for example, a refresh rate and a blanking interval length (e.g., a sum of the VFP, VBP, and VSync values mentioned above).

Returning to FIG. 3, in some examples, at block 305 the device 100 can update one or more display parameters based on operating parameters of the assembly 124. For example, the device 100 can set a refresh rate of the display 116 to a frequency that synchronizes idle time periods at the display 116 with the polling sub-periods 212. For example, if the polling sub-periods 212 have a length of 2 milliseconds, and the total length of one polling sub-period 212 and one listening sub-period 216 is 25 milliseconds, the device 100 can set the refresh rate of the display 116 to 40 Hz, such that the total time elapsed for the rendering of one frame is 25 ms, and the blanking periods separating each frame can be synchronized with the transmission of polling signals by the antenna 132.

At block 310, the device 100 can be configured to determine whether to enable adaptive synchronization of the display 116 and the assembly 124. In some embodiments, block 310 can be omitted. When block 310 is performed, the determination at block 310 can include determining whether the assembly 124 is currently in a polling portion 204. That is, when the assembly 124 is currently in a polling portion 204, the determination at block 310 is affirmative, and when the assembly 124 is currently in an emulation sub-period 208, the determination at block 310 is negative. In further examples, the determination at block 310 may be negative if the assembly 124 is currently in communication with another device, e.g., to complete a transaction or other communication session. When the determination at block 310 is negative, any updates to display parameters implemented, e.g., at a previous performance of block 305, may be reverted. For example, if the refresh rate of the display 116 was reduced from a default of 60 Hz to 40 Hz, following a negative determination at block 310, the refresh rate may be returned to 60 Hz.

Suppressing the synchronization functionality under some conditions may permit the device 100 to balance a certain degree of interference with the display by the assembly 124, in order to improve performance of the assembly 124. For example, during an active transaction via the assembly 124, enabling the synchronization behavior may interrupt the transaction-related communications and cause the transaction to fail, or consume more time. Further, during such a transaction the display 116 is likely to be held against another object, such as a payment card or a payment terminal, and visual artifacts on the display 116 may therefore be less likely to be perceived. During emulation sub-periods 208, the antenna 132 may transmit signals infrequently (only when polled), and thus interference may generally be unlikely.

When the determination at block 310 is negative, the device 100 proceeds to block 315, and transmission functionality at the antenna 132 is enabled. In other words, at block 315 the assembly 124 can control the antenna 132 according to the default sequence shown in FIG. 2.

When the determination at block 310 is affirmative, the device 100 proceeds to block 320. At block 320, the device 100 is configured to determine whether the display 116 is idle. For example, the processor 104 can be configured to determine an expected pattern of future idle time periods from the timing data 424. In other examples, the processor 104 can be configured to determine, via continuous monitoring of the gate lines 408, whether the display 116 is currently idle. As noted above, in this context the display 116 is considered idle when the pixels 400 are not powered by the gate driver 400. The data driver 412 may remain active, for example.

When the current time is within an expected idle time period, and/or when current monitoring (e.g., monitoring of the gate lines 408, control signals such as the tearing effect signal mentioned above, or the like) indicates that the display 116 is currently active, the determination at block 320 is affirmative and the device 100 proceeds to block 315. At block 315, as noted above, transmissions via the antenna 132 are enabled, and the device 100 can send polling signals, responses to polling signals, and the like, until a negative determination at a subsequent performance of block 320 occurs.

When the determination at block 320 is negative, indicating that the display 116 is active, the device 100 proceeds to block 325. At block 325, the device 100 is configured to disable transmission functionality via the antenna 132. Disabling the antenna 132 can involve interrupting an electrical connection to the antenna 132. In some examples, disabling the antenna 132 need not involve disconnecting the antenna 132, however. Instead, the controller 128 can be configured to modify the transmission timing of polling and/or other short-range wireless communication signals to avoid such transmissions during the idle time period.

Figure 5A:
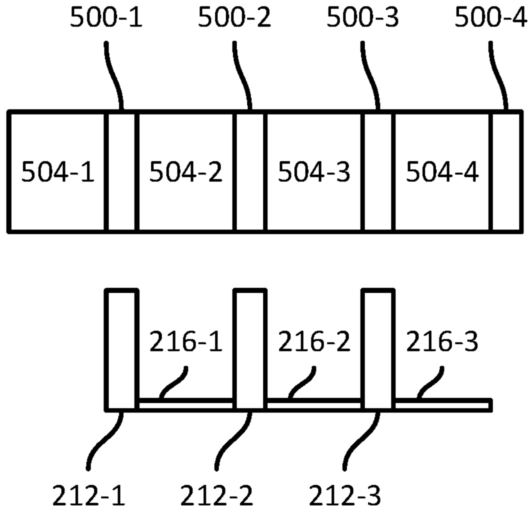
FIG. 5A is a diagram illustrating an example performance of the method of FIG. 3.

For example, referring to FIG. 5A, an example performance of the method 300 is shown in which the transmission of polling signals in polling sub-periods 212 is synchronized with idle time periods 500-1, 500-2, 500-3, and 500-4 between rendered frames 504-1, 504-2, 504-3, and 504-4 at the display 116. Thus, the determination at block 320 at the start of each frame 504 is negative, and during rendering of the frame, transmissions from the antenna 132 are disabled. However, the frame rate at the display 116 in this example has been modified, e.g., to 40 Hz, such that frame rendering coincides with listening sub-periods 216. The polling sub-periods 212, on the other hand, coincide with idle time periods 500, during which the determination at block 320 is affirmative.

Figure 5B:
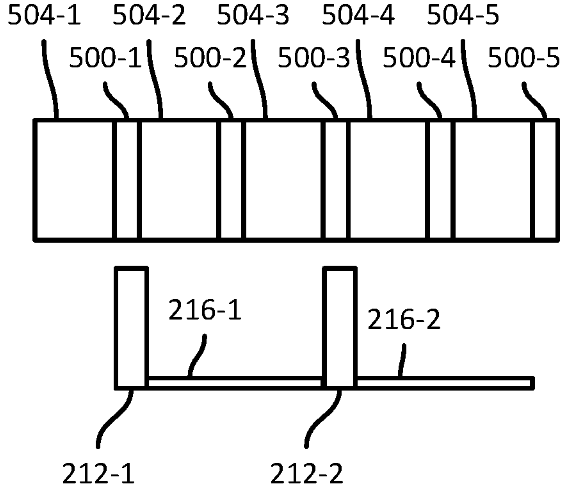
FIG. 5B is a diagram illustrating another example performance of the method of FIG. 3.

FIG. 5B shows another example, in which the frame rate of the display 116 is greater than in FIG. 5A (e.g., 50 Hz). In this example, the default frequency of the polling sub-periods 212 does not coincide with the idle time periods 500. The polling sub-periods 212 may therefore be delayed relative to the default settings shown in FIG. 5A, e.g., by lengthening the listening sub-periods 216. As will be apparent from FIG. 5B, the length of each polling sub-period 212 may exceed the length of each idle period 500. In some examples, this may be tolerable, as the small degree of overlap between a polling sub-period 216 and a frame 504 may lead to an acceptably small level of interference. In other examples, the controller 128 can shorten the length of each polling sub-period 216, e.g., by terminating the transmission of polling signals upon making a negative determination at block 320. In still other examples, the device 100 can dynamically control the length of the idle periods 500, e.g., retaining the same frame rate, but lengthening the idle periods 500 and shortening the time periods during which the frames 504 are rendered.

As noted earlier, the synchronization functionality discussed above can also be applied to the touch panel 120. For example, the operating parameters for the touch panel can include a scan rate (e.g., 100 Hz, although a wide variety of scan rates can be used, and the scan rate for a given touch panel can vary over time), and a scan length. The length of a scan may be short, e.g., less than 1 ms. Thus, for the remainder of the time until the next scan (e.g., about 9 ms, for a scan rate of 100 Hz), the touch panel is considered idle. The device 100 can thus control the antenna 132 to transmit only during such idle periods. When transmissions from the antenna 132 are synchronized with both the display 116 and the touch panel 120, the device 100 can determine respective idle time periods for each of the display 116 and the touch panel 120, and enable transmission at the antenna 132 during overlapping portions of those time periods. In other words, NFC or other short-range transmission may be enabled only when both the touch panel 120 and the display 116 are idle.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:

determining, at a controller of a computing device, an idle time period corresponding to a display of the computing device;

enabling a transmission function of a short-range wireless communication assembly of the computing device during the idle time period; and disabling the transmission function of the short-range wireless communication assembly outside the idle time period;

determining, at the controller, a second idle time period corresponding to a touch panel of the computing device;

enabling the transmission function of the short-range wireless communication assembly during overlapping portions of the idle time period and the second idle time period when the display and the touch panel are idle and the short-range wireless communication assembly is transmitting polling signals via an antenna distinct from touch electrodes of the touch panel; and disabling the transmission function of the short-range wireless communication assembly when at least one of the display and the touch panel are not idle.

2. The method of claim 1, wherein the idle time period corresponds to a blanking interval between successive frames rendered by the display.

3. The method of claim 1, wherein determining the second idle time period comprises obtaining a scan rate of the touch panel.

4. The method of claim 1, wherein determining the idle time period corresponding to the display comprises:

monitoring a gate line supplying power to pixel elements of the display; and determining that the idle time period has begun when the gate line is idle.

5. The method of claim 1, wherein determining the idle time period corresponding to the display comprises:

obtaining frame timing data corresponding to the display.

6. The method of claim 1, further comprising:

prior to disabling the transmission function of the short-range wireless communication assembly, determining that the short-range wireless communication assembly is operating in a polling mode.

7. The method of claim 1, further comprising:

prior to disabling the transmission function of the short-range wireless communication assembly, determining that the short-range wireless communication assembly is not currently communicating with another device.

8. The method of claim 1, further comprising:

updating an operational parameter of the display based on a period between polling sub-periods of the short-range wireless communication assembly.

9. The method of claim 8, wherein the operational parameter comprises a refresh rate of the display.

10. The method of claim 1, wherein the transmission function comprises transmitting near-field communication (NFC) polling signals.

11. A computing device, comprising:

a display;

a short-range wireless communication assembly including an antenna; and a processor configured to:

determine an idle time period corresponding to the display;

enable a transmission function of the short-range wireless communication assembly during the idle time period;

disable the transmission function of the short-range wireless communication assembly outside the idle time period;

determine a second idle time period corresponding to a touch panel of the computing device;

enable the transmission function of the short-range wireless communication assembly during overlapping portions of the idle time period and the second idle time period when the display and the touch panel are idle and the short-range wireless communication assembly is transmitting polling signals via an antenna distinct from touch electrodes of the touch panel; and disable the transmission function of the short-range wireless communication assembly when at least one of the display and the touch panel are not idle.

12. The computing device of claim 11, wherein the idle time period corresponds to a blanking interval between successive frames rendered by the display.

13. The computing device of claim 11, wherein the processor is further configured to determine the second idle time period by obtaining a scan rate of the touch panel.

14. The computing device of claim 11, wherein the processor is further configured to determine the idle time period corresponding to the display by:

monitoring a gate line supplying power to pixel elements of the display; and determining that the idle time period has begun when the gate line is idle.

15. The computing device of claim 11, wherein the processor is further configured to determine the idle time period corresponding to the display by:

obtaining frame timing data corresponding to the display.

16. The computing device of claim 11, wherein the processor is further configured to:

prior to disabling the transmission function of the short-range wireless communication assembly, determine that the short-range wireless communication assembly is operating in a polling mode.

17. The computing device of claim 11, wherein the processor is further configured to:

prior to disabling the transmission function of the short-range wireless communication assembly, determine that the short-range wireless communication assembly is not currently communicating with another device.

18. The computing device of claim 11, wherein the processor is further configured to:

update an operational parameter of the display based on a period between polling sub-periods of the short-range wireless communication assembly.

19. The computing device of claim 18, wherein the operational parameter comprises a refresh rate of the display.

* * * * *